United States Patent
Doering et al.

(10) Patent No.: US 7,546,883 B1
(45) Date of Patent: Jun. 16, 2009

(54) VIBRATORY PLOW

(75) Inventors: David Doering, Knoxville, TN (US); Thomas Campbell, Ooltewah, TN (US)

(73) Assignee: Astec Industries, Inc., Chattanooga, TN (US)

( * ) Notice: Subject to any disclaimer, the term of this patent is extended or adjusted under 35 U.S.C. 154(b) by 548 days.

(21) Appl. No.: 11/433,854

(22) Filed: May 15, 2006

(51) Int. Cl.
*A01B 35/00* (2006.01)
*E02F 5/10* (2006.01)

(52) U.S. Cl. .......................... 172/40; 37/367
(58) Field of Classification Search ............ 172/1, 172/40, 56, 272, 554, 699, 165, 667, 735; 405/174, 180–183, 271, 303; 404/117, 133.05, 404/133.02; 173/49; 175/55; 37/366, 367, 37/370, 904
See application file for complete search history.

(56) References Cited

U.S. PATENT DOCUMENTS

| | | | |
|---|---|---|---|
| 3,082,668 A | 3/1963 | Matson | |
| 3,255,682 A | 6/1966 | Giertz-Hedstrom | |
| 3,592,509 A | 7/1971 | Soderlund | |
| 3,618,237 A * | 11/1971 | Davis | 37/367 |
| 3,695,721 A | 10/1972 | Jungel | |
| 3,935,712 A * | 2/1976 | Erickson et al. | 405/182 |
| 4,087,982 A * | 5/1978 | Golobay | 405/182 |
| 4,119,157 A * | 10/1978 | Schuck et al. | 172/477 |
| 4,247,149 A | 1/1981 | Livesay | |
| 4,250,760 A * | 2/1981 | Gurries | 74/61 |
| 4,334,799 A | 6/1982 | Rautenbach et al. | |
| 4,374,602 A | 2/1983 | Gurries et al. | |
| 4,387,859 A | 6/1983 | Gurries | |
| 4,402,629 A | 9/1983 | Gurries | |
| 4,506,740 A * | 3/1985 | Carter | 172/40 |
| 4,647,247 A | 3/1987 | Sandstrom | |
| 4,732,507 A | 3/1988 | Artzberger | |
| 5,190,353 A | 3/1993 | Bechem | |
| 5,397,069 A | 3/1995 | Kitsukawa et al. | |
| 5,462,387 A | 10/1995 | Roth | |
| 5,749,530 A | 5/1998 | Nakayama et al. | |
| 5,887,810 A | 3/1999 | Maruyama | |
| 6,019,544 A | 2/2000 | Emerson et al. | |
| 6,234,718 B1 * | 5/2001 | Moffitt et al. | 405/182 |
| 6,244,355 B1 * | 6/2001 | Hall | 172/40 |
| 6,485,227 B1 | 11/2002 | Mathiowetz | |
| 2002/0110420 A1 | 8/2002 | Murphy | |

FOREIGN PATENT DOCUMENTS

JP          407026508 A      1/1995

* cited by examiner

*Primary Examiner*—Robert E Pezzuto
(74) *Attorney, Agent, or Firm*—Chambliss, Bahner & Stophel, P.C.

(57) ABSTRACT

A plow assembly includes a housing, a shaft having a first eccentricity and a shaft having a second eccentricity. The shaft having a first eccentricity is mounted within the housing for rotation about a first axis of rotation, and the shaft having a second eccentricity is mounted within the housing for rotation about a second axis of rotation. The assembly also includes a surface breaker blade and a balancing assembly. The surface breaker blade is mounted on the shaft having a first eccentricity in such a manner that rotation of the shaft having a first eccentricity causes the surface breaker blade to move in response to the first eccentricity of the shaft. The balancing assembly is mounted on the shaft having the second eccentricity in such a manner that rotation of the shaft having the second eccentricity causes the balancing assembly to move in response to the second eccentricity of the shaft. The assembly also includes a mechanism for rotating the shaft having a first eccentricity about the first axis of rotation, and a mechanism for rotating the shaft having a second eccentricity about the second axis of rotation.

20 Claims, 7 Drawing Sheets

VIBRATORY PLOW

FIELD OF THE INVENTION

This invention relates generally to an apparatus that may be used to cut into, break or plow a surface, including (but not limited to) a pavement surface, in preparation for the installation of pipes, cables and other utilities under the surface, or in connection with pavement installation or repair. More particularly, the invention relates to such an apparatus that is adapted to be mounted on or towed behind a vehicle to permit continuous plowing of the surface.

BACKGROUND AND DESCRIPTION OF THE PRIOR ART

It is frequently necessary to cut or break a surface, such as a dirt or clay surface which may have rocks and/or roots embedded therein or a paved surface such as an asphalt roadway, in order to permit the installation of utilities of various types. It is also necessary at times to remove portions of pavement from roadways and other paved surfaces in order to install such utilities or in preparation for repair or replacement of the pavement. Sometimes, the surface is cut or broken for these purposes by repeatedly driving a chiseling or crushing device downwardly into the surface. One such device is described in U.S. Pat. No. 4,402,629 of Gurries. Because of the nature of such devices, they move intermittently across a surface, raising and dropping their chisels or crushing tools. Consequently, these devices are limited in the speed at which they can be operated to cut into a surface or to break up pavement. Other cutting or breaking devices employ rippers or cutters in which a blade or blades are pulled through the upper portion of the surface (including, but not limited to pavement) by a vehicle as it moves along the surface. Some such devices are described in U.S. Pat. No. 3,592,509 of Soderlund and in U.S. Pat. No. 4,374,602 of Gurries et al. Generally, all of the prior art devices tend to transmit significant vibrations to the transport vehicle, making such work difficult for an operator to endure for a significant length of time.

It would be desirable, therefore, if a surface cutting or breaking assembly could be provided that minimizes the vibrations that are transmitted to a towing or support vehicle. It would also be desirable if such an assembly could be provided that is relatively simple to build, maintain and operate.

ADVANTAGES OF THE INVENTION

Among the advantages of the invention is that it provides a surface cutting or breaking assembly that minimizes the transmission of vibrations outside of assembly housing. Another advantage of the invention is that it provides such an assembly that is mechanically uncomplicated and inexpensive to build and operate.

Additional advantages of this invention will become apparent from an examination of the drawings and the ensuing description.

EXPLANATION OF TECHNICAL TERMS

As used herein, the term "actuator" refers to a device that imparts linear or rotational motion to a component. The term "actuator" thus includes hydraulic actuators or cylinders, pneumatic actuators, motors, motorized drives, levers, springs, gear systems and combinations thereof.

Linear actuators generate a force that is directed along a line, whereas rotary actuators generate a force which is directed along an arc and/or is adapted to rotate a component about an axis of rotation.

As used herein, the term "motor" refers to an electric, hydraulic or electro-hydraulic rotary actuator.

As used herein, the term "front" and similar terms, when used in reference to a surface cutting or breaking assembly that is adapted to be pulled behind a vehicle (or a component of such an assembly), refers to the component of the assembly or the side or portion of such component or of the entire assembly that is nearest the towing vehicle when the assembly is being pulled in a straight line along the direction of travel of the vehicle.

As used herein, the term "rear" and similar terms, when used in reference to a surface cutting or breaking assembly that is adapted to be pulled behind a vehicle (or a component of such an assembly), refers to the component of the assembly or the side or portion of such component or of the entire assembly that is farthest from the towing vehicle when the assembly is being pulled in a straight line along the direction of travel of the vehicle.

As used herein, the term "lower" and similar terms, when used in reference to a surface cutting or breaking assembly that is adapted to be pulled behind a vehicle (or a component of such an assembly), refers to the component of the assembly or the side or portion of such component or of the entire assembly that is nearest to the surface to be cut or broken.

As used herein, the term "upper" and similar terms, when used in reference to a surface cutting or breaking assembly that is adapted to be pulled behind a vehicle (or a component of such an assembly), refers to the component of the assembly or the side or portion of such component or of the entire assembly that is opposite the lower component, side or portion.

As used herein, the term "plow" and similar terms refers to a surface cutting or breaking assembly that is adapted to be pulled behind or mounted on a towing vehicle and used in cutting or breaking the surface (such as, but not necessarily a paved surface) along which the towing vehicle travels.

As used herein, the term "vibration isolator" refers to an elastomeric pad or other device that is adapted to minimize the transmission of vibrations from one device or component to another.

SUMMARY OF THE INVENTION

The invention comprises a plow assembly which includes a housing, a shaft having a first eccentricity and a shaft having a second eccentricity. The shaft having a first eccentricity is mounted within the housing for rotation about a first axis of rotation, and the shaft having a second eccentricity is mounted within the housing for rotation about a second axis of rotation. The assembly also includes a surface breaker blade and a balancing assembly. The surface breaker blade is mounted on the shaft having a first eccentricity in such a manner that rotation of the shaft having a first eccentricity causes the surface breaker blade to move in response to the first eccentricity of the shaft. The balancing assembly is mounted on the shaft having the second eccentricity in such a manner that rotation of the shaft having the second eccentricity causes the balancing assembly to move in response to the second eccentricity of the shaft. The assembly also includes means for rotating the shaft having a first eccentricity about the first axis of rotation, and means for rotating the shaft having a second eccentricity about the second axis of rotation. In a preferred embodiment of the invention, the shaft having the first eccentricity and the shaft having the second eccentricity comprise a single shaft, and the first axis of rotation is coincident with the second axis of rotation. Furthermore, in this preferred embodiment, the means for rotating the shaft having the first eccentricity and the means for rotating the shaft having the second eccentricity comprise a single means.

In order to facilitate an understanding of the invention, the preferred embodiments of the invention are illustrated in the drawings, and a detailed description thereof follows. It is not intended, however, that the invention be limited to the particular embodiments described or to use in connection with the apparatus illustrated herein. Various modifications and alternative embodiments such as would ordinarily occur to one skilled in the art to which the invention relates are also contemplated and included within the scope of the invention described and claimed herein.

BRIEF DESCRIPTION OF THE DRAWINGS

The presently preferred embodiments of the invention are illustrated in the accompanying drawings, in which like reference numerals represent like parts throughout, and in which.

DESCRIPTION OF THE PREFERRED EMBODIMENTS OF THE INVENTION

Figure 1:
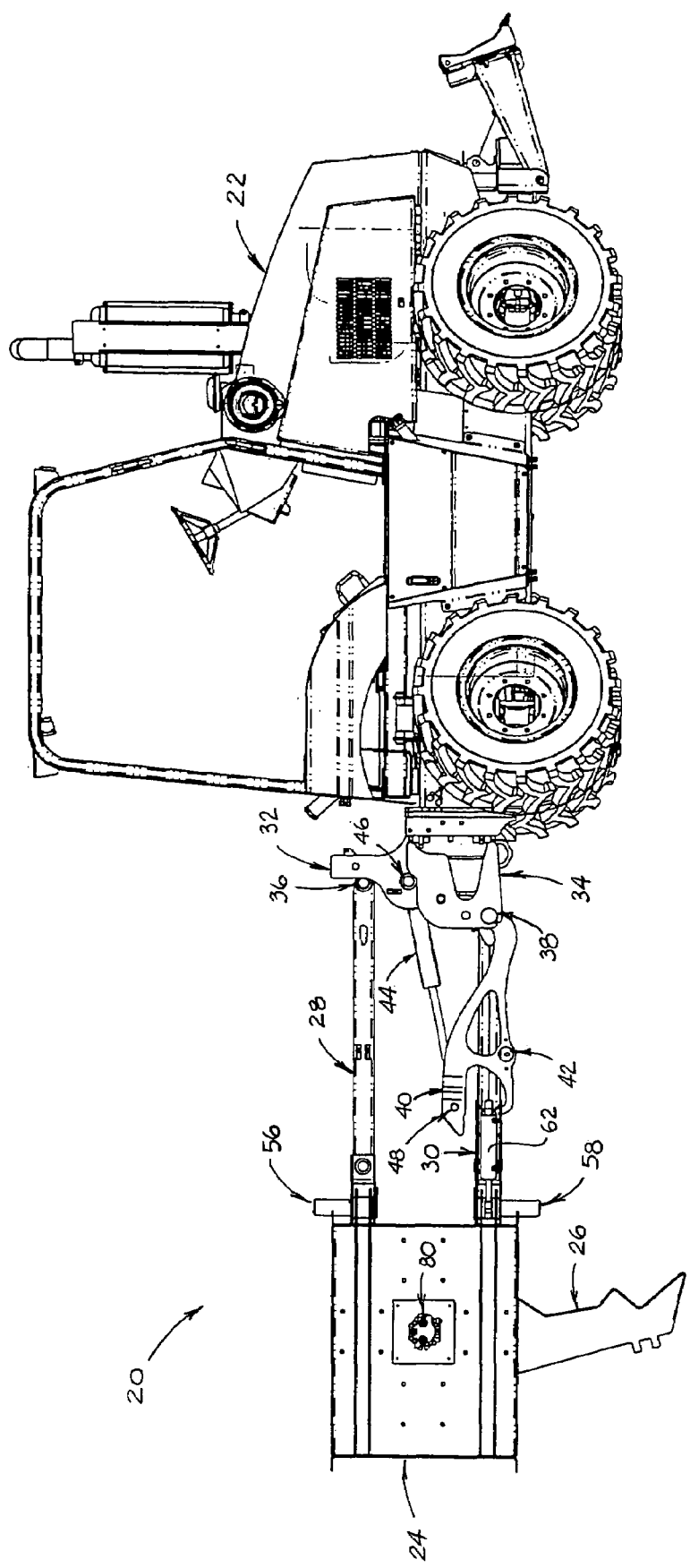
FIG. 1 is a side view of a preferred embodiment of the invention, shown being towed by a vehicle.

FIGS. 1-10 illustrate a preferred embodiment 20 of the plow assembly which is the subject of this invention. Preferred assembly 20 is adapted to be towed by a vehicle such as vehicle 22 (shown in FIG. 1), and includes housing 24, blade component 26 and a mounting assembly comprising upper and lower support arms 28 and 30, respectively. Attached to the rear of vehicle 22 is a mounting bracket comprised of upper portion 32 and lower portion 34. The forward end of upper support arm 28 is pivotally mounted on upper portion 32 of the mounting bracket at upper pivot 36, and the forward end of lower support arm 30 is pivotally mounted on lower portion 34 of the mounting bracket at lower pivot 38. An intermediate support arm 40 is also pivotally attached at its forward end to lower portion 34 of the mounting bracket at lower pivot 38. The rear end of intermediate support arm 40 is pivotally attached to lower support arm 30 at intermediate pivot 42. Actuator 44 is attached between pivot 46 of upper portion 32 of the mounting bracket and pivot 48 of intermediate support arm 40. Actuator 40 is adapted to raise the lower the upper and lower support arms, and thereby to raise and lower housing 24 and blade component 26.

Figure 2:
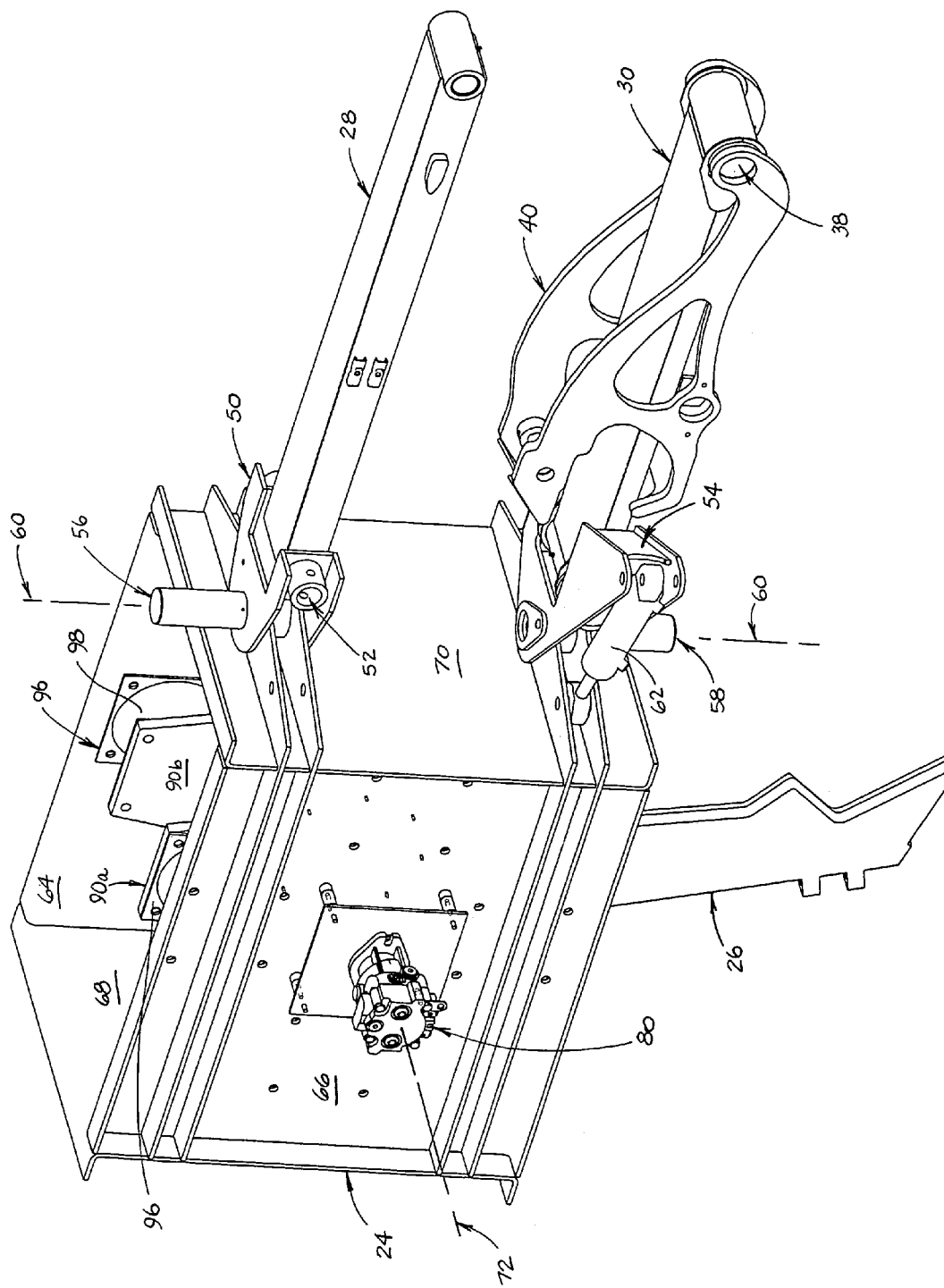
FIG. 2 is a perspective view of the embodiment of the invention illustrated in FIG. 1.
Figure 3:
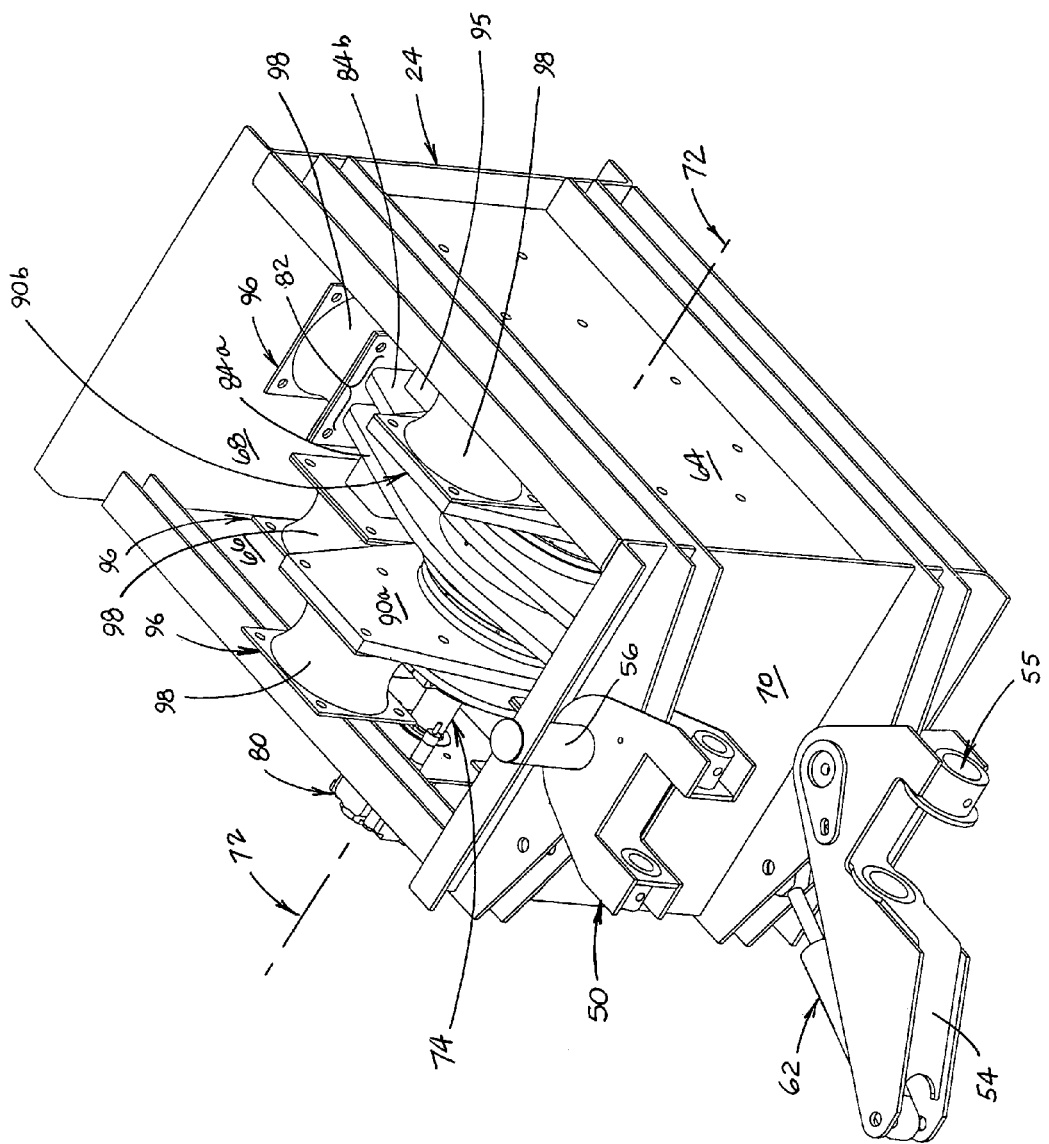
FIG. 3 is another perspective view of the embodiment of the invention illustrated in FIGS. 1 and 2.

Referring now to FIG. 2, upper support arm 28 is pivotally mounted to upper support bracket 50 at pivot 52, and lower support arm 30 is pivotally mounted to lower support bracket 54 at pivot 55 (best shown in FIG. 3). Housing 24 is pivotally attached to upper support bracket 50 by upper pivot pin 56 and to lower support bracket 54 by lower pivot pin 58. Pivot pins 56 and 58 define a generally vertical axis 60 about which the housing can pivot with respect to the mounting assembly. Actuator 62 is attached between housing 24 and lower support bracket 56, and is adapted to pivot the housing about axis 60.

It will be appreciated by those having ordinary skill in the art to which the invention relates that various alternative means within the scope of the invention claimed herein may be provided for attaching the plow assembly to a vehicle or for incorporating the plow assembly into a vehicle.

As shown in FIGS. 2 and 3, preferred housing 24 includes left side wall 64, right side wall 66, rear wall 68 and front wall 70. Mounted in the housing for rotation about axis 72 is shaft 74 (best shown in FIGS. 5-10). Shaft 74 has a first eccentric portion 76, and a second eccentric portion that is comprised of right eccentric portion 78a and left eccentric portion 78b. By examining FIGS. 5 and 6, it can be appreciated that when the shaft is in the position shown in FIG. 5, the second eccentric portion includes a small vertically-oriented eccentricity and the first eccentric portion includes a somewhat larger vertically-oriented eccentricity. In the preferred embodiment of the invention, a motor such as hydraulic motor 80 is provided to rotate the shaft with respect to the housing.

Figure 4:
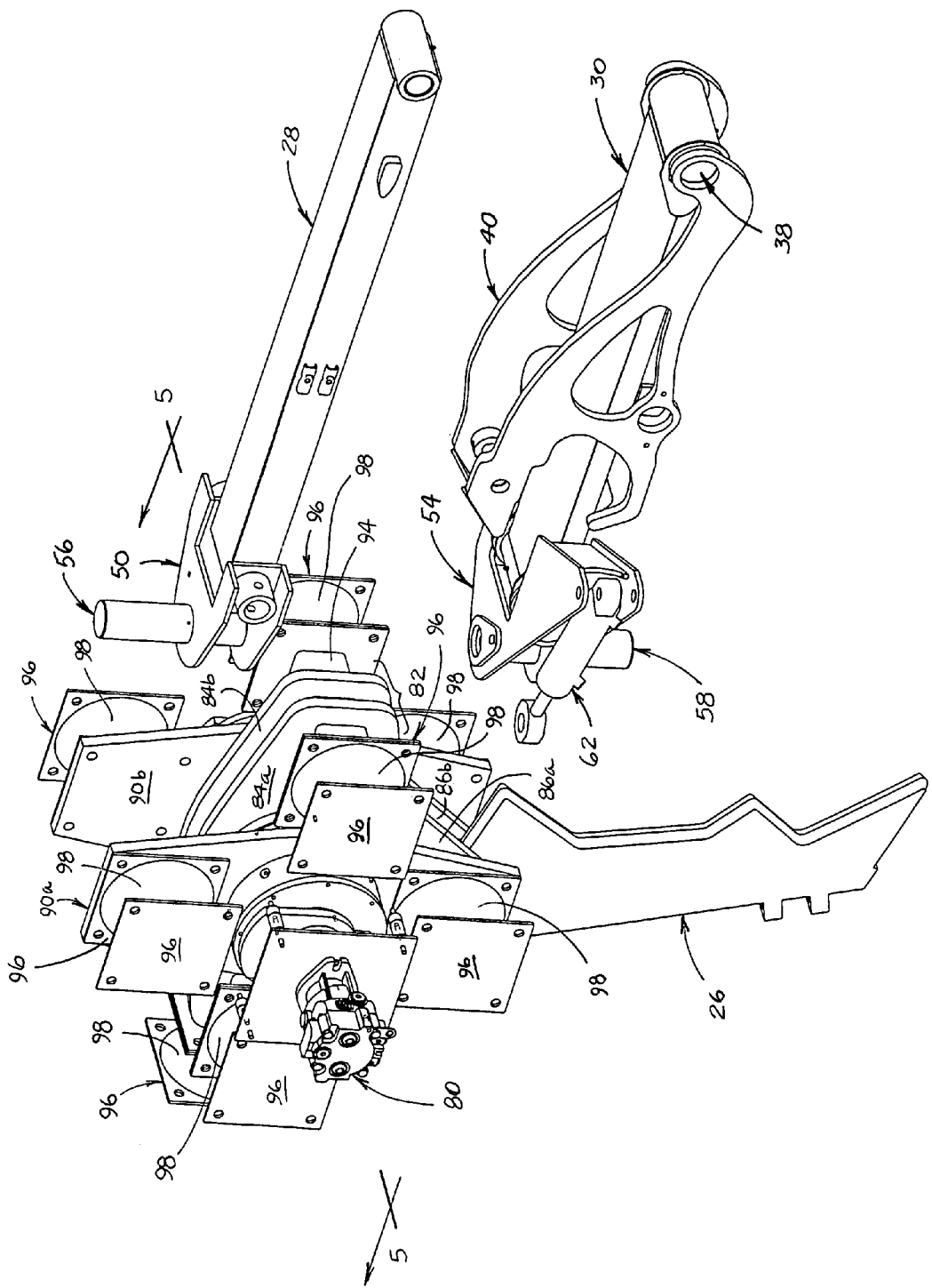
FIG. 4 is a view of a portion of the preferred embodiment of the invention, similar to that of FIG. 2, but with the housing removed.
Figure 5:
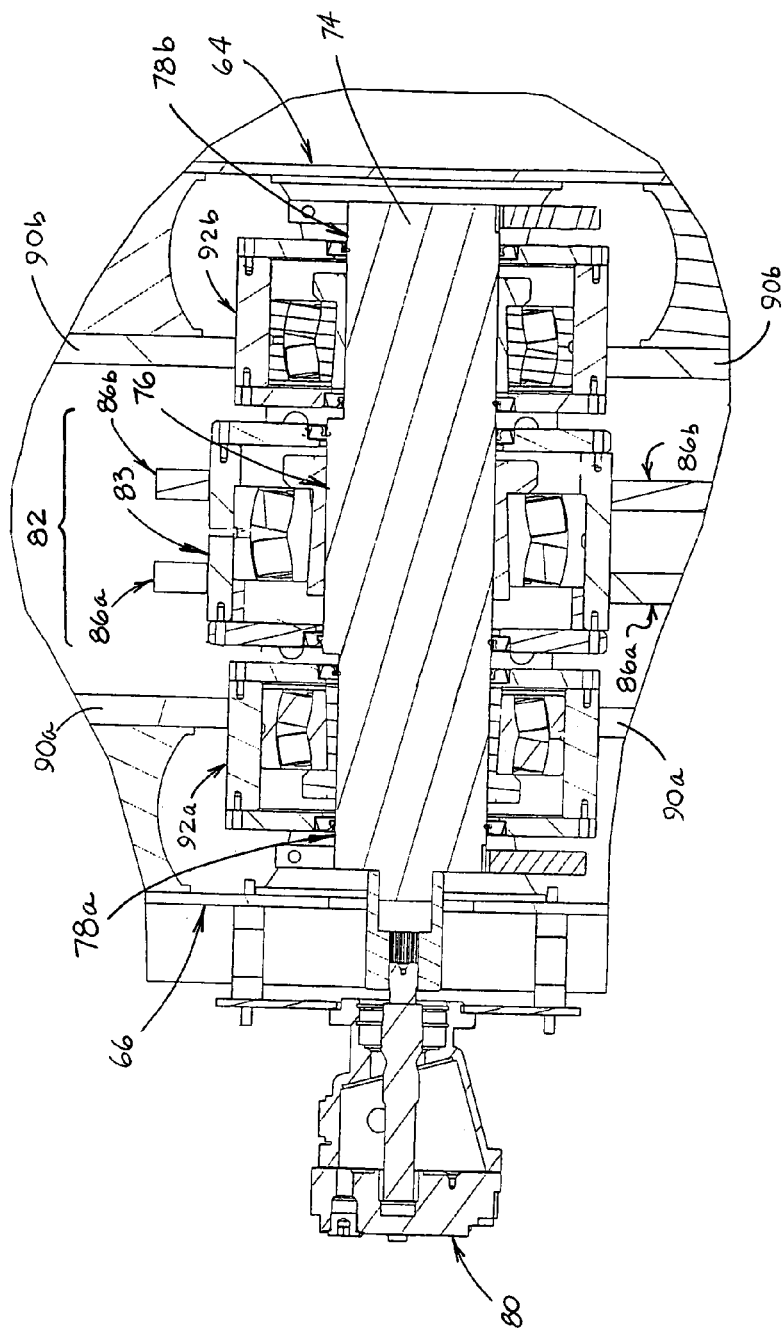
FIG. 5 is a cross sectional view of the preferred embodiment of the invention, taken through line 5-5 of FIG. 4.
Figure 6:
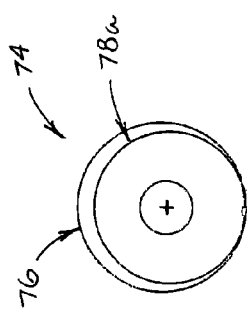
FIG. 6 is an end view of the shaft of the preferred embodiment of the invention, showing the shaft as oriented in FIG. 5.

In the preferred embodiment of the invention illustrated in FIGS. 1-10, a surface breaker blade comprising blade mount 82 (see FIGS. 3, 5 and 7-10) and blade component 26 is mounted within the housing so as to move in response to first eccentric portion 76 as shaft 74 rotates about axis 72. As best shown in FIGS. 4 and 5, blade mount 82 is comprised of blade bearing assembly 83 and a pair of elongate plates, namely elongate plate 84a which includes blade component mounting portion 86a, and elongate plate 84b which includes blade component mounting portion 86b. Blade component 26 is detachably mounted to blade mount 82 between blade component mounting portion 86a and blade component mounting portion 86b in a manner known to those having ordinary skill in the art to which the invention relates. As shown in FIG. 4, preferred elongate plates 84a and 84b are disposed generally horizontally within the housing, and the mass of each of the elongate plates is generally divided equally between the front and rear sides of axis of rotation 72. In other words, a plane (not shown) through each elongate plate which includes the axis of rotation and is perpendicular to the long axis of the elongate plate would bisect the elongate plate so that the portion of the mass of the plate in front of such plane would equal the portion of the mass of the plate behind the plane.

The preferred embodiment of the invention illustrated in FIGS. 1-10 also includes a balancing assembly which is mounted within the housing so as to move in response to the second eccentric portion of shaft 74 as the shaft rotates about axis 72. The preferred balancing assembly is comprised of right and left balancing components 88a and 88b, respectively, which are illustrated schematically in FIGS. 7-10. Preferably, as shown in FIGS. 4 and 5, the balancing assembly comprises a pair of elongate balancing plates 90a and 90b that are mounted on opposite sides of blade mount 82 over right eccentric portion 78a and left eccentric portion 78b, respectively, of shaft 74. As best shown in FIG. 5, balancing plate 90a is mounted on right eccentric portion 78a by means of bearing assembly 92a, and balancing plate 90b is mounted on left eccentric portion 78b by means of bearing assembly 92b. As shown in FIG. 4, preferred elongate balancing plates 90a and 90b are disposed generally vertically within the housing, and the mass of the balancing assembly, comprising the combined mass of the two elongate balancing plates, is generally divided equally between the upper and lower sides of axis of rotation 72. In other words, a plane (not shown) through each elongate plate which includes the axis of rotation and is perpendicular to the long axis of the elongate plate would bisect the elongate plate so that the portion of the mass of the plate above such plane would equal the portion of the mass of the plate below the plane.

The invention also contemplates that the blade mount could include an elongate component that is disposed generally vertically within the housing, and that the balancing assembly could include an elongate component that is disposed generally horizontally within the housing, although such embodiment of the invention is not disclosed in the drawings. In such event, the mass of the elongate component of the blade mount would preferably be generally divided equally between the upper and lower sides of the axis of rotation, and the mass of the elongate component of the balancing assembly would preferably be generally divided equally between the front and rear sides of the axis of rotation.

Figure 7:
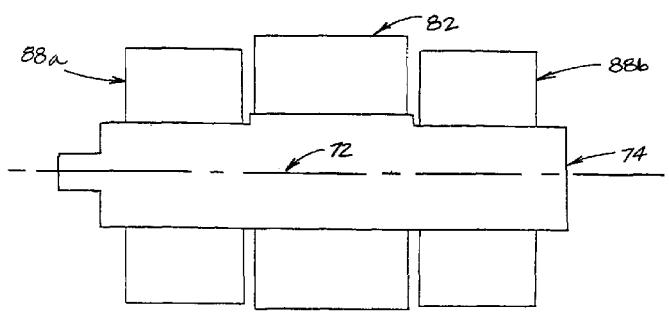
FIG. 7 is a schematic view of the shaft, blade mount and balancing assembly of the preferred embodiment of the invention, showing the blade mount in an upper position and the balancing assembly in a lower position.
Figure 8:
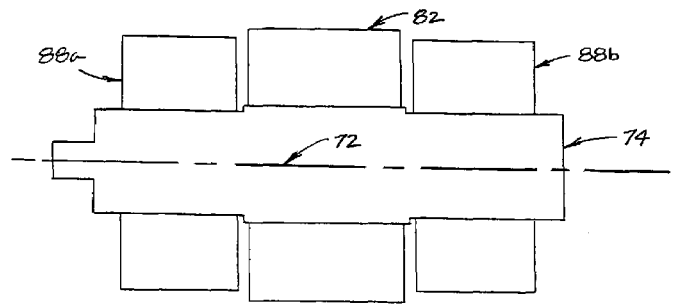
FIG. 8 is a schematic view of the shaft, blade mount and balancing assembly of the preferred embodiment of the invention, showing the blade mount in a rearward position and the balancing assembly in a forward position.
Figure 9:
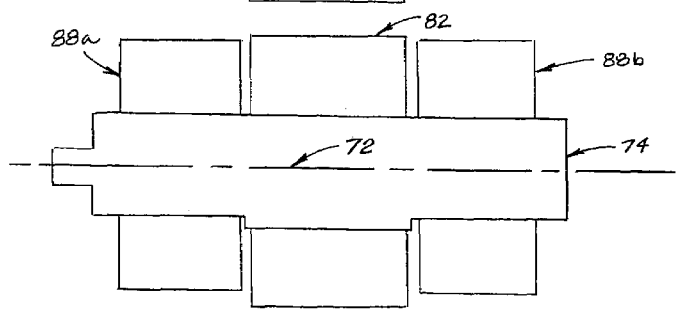
FIG. 9 is a schematic view of the shaft, blade mount and balancing assembly of the preferred embodiment of the invention, showing the blade mount in a lower position and the balancing assembly in an upper position.
Figure 10:
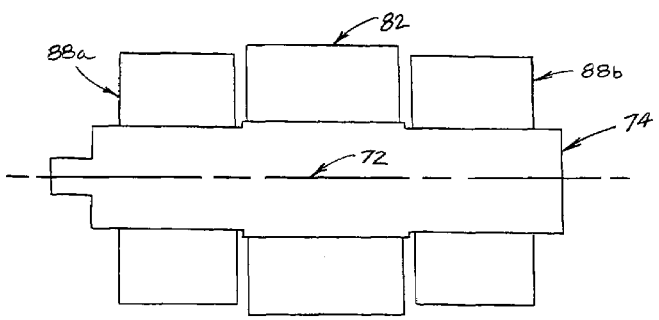
FIG. 10 is a schematic view of the shaft, blade mount and balancing assembly of the preferred embodiment of the invention, showing the blade mount in a forward position and the balancing assembly in a rearward position.

FIGS. 5 and 7-10 illustrate the various positions of shaft 74 throughout a single rotation about axis 72. Thus, as shown in FIGS. 5 and 7, the first and second eccentricities are arranged and adapted so that blade mount 82 is in its upwardmost position while right and left balancing components 88a and 88b, respectively, are in their lowermost positions. FIG. 8 illustrates shaft 74 rotated by 90° from the position of FIGS. 5 and 7. In this position, the blade mount is in its most rearward position and the right and left balancing components are in their most forward positions. FIG. 9 illustrates shaft 74 rotated by 90° from the position of FIG. 8. In this position, the blade mount is in its lowermost position and the right and left balancing components are in their uppermost positions. FIG. 10 illustrates shaft 74 rotated by 90° from the position of FIG. 9. In this position, the blade mount is in its most forward position and the right and left balancing components are in their most rearward positions. FIGS. 5 and 7 illustrate shaft 74 rotated by 90° from the position of FIG. 10. Because of the preferred configuration of shaft 74, as well as the preferred arrangement of the surface breaker blade and the balancing assembly on the shaft, rotation of shaft 74 will impart linear momentum to the surface breaker blade with respect to the housing that is substantially equal to and opposite the linear momentum imparted to the balancing assembly with respect to the housing. Consequently, vibrations produced during the operation of the assembly will not generally be transmitted to the mounting assembly or to vehicle 22.

In the preferred embodiment of the invention illustrated in FIGS. 1-10, a plurality of vibration isolators are mounted between the surface breaker blade and the housing. Thus, as best shown in FIGS. 3 and 4, elongate plate 84a and elongate plate 84b are joined by front support bar 94 (shown in FIG. 4) and rear support bar 95 (shown in FIG. 3). Attached to the right side of front support bar 94 between elongate plate 84a and right side wall 66 of housing 24 is a vibration isolator comprising a pair of isolator mounting plates 96 and an elastomeric isolator 98. A similar vibration isolator (comprising a pair of isolator mounting plates 96 and an elastomeric isolator 98) is mounted to the left side of front support bar 94 between elongate plate 84b and left side wall 64 of housing 24. In addition, a vibration isolator (comprising a pair of isolator mounting plates 96 and an elastomeric isolator 98) is attached to the right side of rear support bar 95 between elongate plate 84a and right side wall 66 of housing 24. Another similar vibration isolator is attached to the left side of rear support bar 95 between elongate plate 84b and left side wall 64 of housing 24. In order to compensate for resistance encountered by blade component 26 as it cuts or breaks pavement or another surface, it is also preferred that a vibration isolator (comprising a pair of isolator mounting plates 96 and an elastomeric isolator 98) be attached between the rear end of blade mount 82 (comprising elongate plates 84a and 84b) and rear wall 68 of housing 24, as best shown in FIG. 3.

In the preferred embodiment of the invention illustrated in FIGS. 1-10, a plurality of vibration isolators are also mounted between the balancing assembly and the housing. Thus, as shown in FIGS. 3 and 4, a vibration isolator comprising a pair of isolator mounting plates 96 and an elastomeric isolator 98 is mounted between the upper portion of elongate plate 90a and right side wall 66 of housing 24. A similar vibration isolator (comprising a pair of isolator mounting plates 96 and an elastomeric isolator 98) is mounted between the lower portion of elongate plate 90a and the right side wall. Another vibration isolator (comprising a pair of isolator mounting plates 96 and an elastomeric isolator 98) is mounted between the upper portion of elongate plate 90b and left side wall 64 of housing 24, and a similar vibration isolator is mounted between the lower portion of elongate plate 90b and left side wall 64 of housing 24.

Of course, it will be appreciated by those having ordinary skill in the art to which the invention relates that various alternative means besides the vibration isolators described herein are within the scope of the invention claimed herein and may be provided for isolating the vibrations produced by the invention from the housing.

Figure 11:
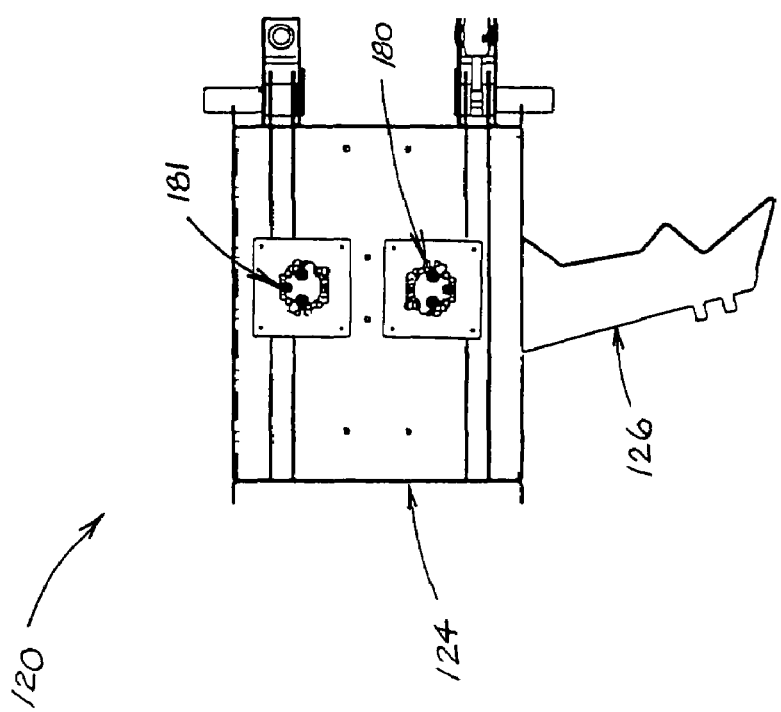
FIG. 11 is a side view of a first alternative embodiment of the invention.

A first alternative embodiment of the invention is illustrated in FIG. 11. As shown therein, plow assembly 120 comprises housing 124 (which is similar to housing 24 of assembly 20), blade component 126 (which is essentially identical to blade component 26 of assembly 20) and a mounting assembly (only a portion of which is shown) which is essentially the same as the mounting assembly illustrated in FIG. 1. Mounted in housing 124 for rotation about a first axis is a first shaft to which motor 180 is attached. Mounted in the housing for rotation about a second axis is a second shaft to which motor 181 is attached. The first shaft has a first eccentric portion that is similar to eccentric portion 76 of shaft 74, and the second shaft has a second eccentric portion that is comprised of right and left eccentric portions that are similar to right and left eccentric portions 78a and 78b, respectively, of shaft 74. In this embodiment, the first shaft and the second shaft are oriented with respect to each other so that the relative positions of the first eccentric and the second eccentric are essentially the same as the relative positions of eccentric portions 76, 78a and 78b of shaft 74.

In the embodiment of FIG. 11, a surface breaker blade comprising a blade mount (similar to blade mount 82 of assembly 20) and blade component 126 is mounted within the housing so as to move in response to the first eccentric portion as the first shaft rotates about the first axis. Blade component 126 is detachably mounted to this blade mount in a manner known to those having ordinary skill in the art to which the invention relates. This embodiment of the invention also includes a balancing assembly which is mounted within the housing so as to move in response to the second eccentric portion of the second shaft as the second shaft rotates about the second axis. This balancing assembly is comprised of right and left balancing components that are similar to right and left balancing components 88a and 88b of assembly 20. Preferably, this balancing assembly comprises a pair of elongate balancing plates (similar to balancing plates 90a and 90b of assembly 20) that are mounted on opposite sides of the blade mount on the right eccentric portion and the left eccentric portion of the second shaft.

Preferably, in this embodiment of the invention, the surface breaker blade, first shaft having the first eccentricity, balancing assembly and second shaft having the second eccentricity are arranged and adapted so that simultaneous rotation of the shaft having the first eccentricity and the shaft having the second eccentricity will impart linear momentum to the surface breaker blade with respect to the housing that is substantially equal to and opposite the linear momentum imparted to the balancing assembly with respect to the housing. In this embodiment of the invention, a plurality of vibration isolators are also provided similar to the vibration isolators of assembly 20. Thus, vibration isolators are mounted between the surface breaker blade and the housing and between the balancing assembly and the housing.

Figure 12:
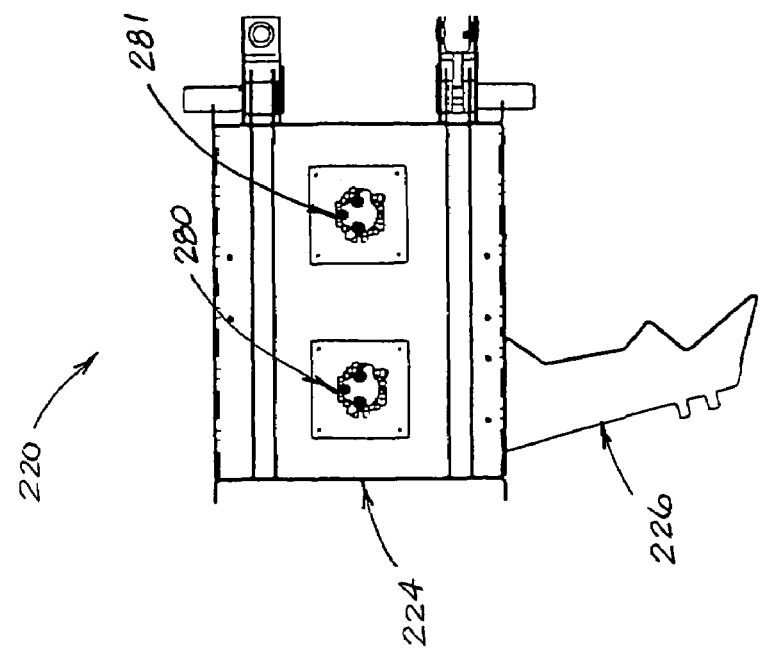
FIG. 12 is a side view of a second alternative embodiment of the invention.

A second alternative embodiment of the invention is illustrated in FIG. 12. As shown therein, plow assembly 220 comprises housing 224 (which is similar to housing 24 of assembly 20), blade component 226 (which is essentially identical to blade component 26 of assembly 20) and a mounting assembly (only a portion of which is shown) which is essentially the same as the mounting assembly illustrated in FIG. 1. Mounted in housing 224 for rotation about a first axis is a first shaft to which motor 280 is attached. Mounted in the housing for rotation about a second axis is a second shaft to which motor 281 is attached. The first shaft has a first eccentric portion that is similar to eccentric portion 76 of shaft 74, and the second shaft has a second eccentric portion that is similar to right and left eccentric portions 78a and 78b, respectively, of shaft 74. In this embodiment, the first shaft and the second shaft are oriented with respect to each other so that the relative positions of the first eccentric and the second eccentric are essentially the same as the relative positions of eccentric portions 76, 78a and 78b of shaft 74. In the embodiment of FIG. 12, a surface breaker blade comprising a blade mount similar to blade mount 82 of assembly 20) and blade component 226 is mounted within the housing so as to move in response to the first eccentric portion as the first shaft rotates about the first axis. Blade component 226 is detachably mounted to this blade mount in a manner known to those having ordinary skill in the art to which the invention relates. This embodiment of the invention also includes a balancing assembly which is mounted within the housing so as to move in response to the second eccentric portion of the second shaft as the second shaft rotates about the second axis. Preferably, this balancing assembly comprises an elongate balancing plate (similar to one of balancing plates 90a and 90b of assembly 20, but with twice the mass) that is mounted on the second eccentric portion of the second shaft.

Preferably, in this embodiment of the invention, the surface breaker blade, first shaft having the first eccentricity, balancing assembly and second shaft having the second eccentricity are arranged and adapted so that simultaneous rotation of the shaft having the first eccentricity and the shaft having the second eccentricity will impart linear momentum to the surface breaker blade with respect to the housing that is substantially equal to and opposite the linear momentum imparted to the balancing assembly with respect to the housing. In this embodiment of the invention, a plurality of vibration isolators are also provided similar to the vibration isolators of assembly 20. Thus, vibration isolators are mounted between the surface breaker blade and the housing and between the balancing assembly and the housing.

Although this description contains many specifics, these should not be construed as limiting the scope of the invention but as merely providing illustrations of some of the presently preferred embodiments thereof, as well as the best mode contemplated by the inventors of carrying out the invention. The invention, as described herein, is susceptible to various modifications and adaptations, as would be understood by those having ordinary skill in the art to which the invention relates, and the same are intended to be comprehended within the meaning and range of equivalents of the appended claims.

What is claimed is:

1. A plow assembly comprising:
   (a) a housing;
   (b) a surface breaker blade;
   (c) means for mounting the surface breaker blade within the housing, said means being adapted to impart surface breaker momentum to the surface breaker blade with respect to the housing;
   (d) a balancing assembly;
   (e) means for mounting the balancing assembly within the housing, said means being adapted to impart balancing momentum to the balancing assembly with respect to the housing that is substantially equal to and opposite the surface breaker momentum.

2. The plow assembly of claim 1 wherein:
   (a) the means for mounting the surface breaker blade within the housing comprises:
      (i) a first shaft having a first eccentricity, said first shaft being mounted within the housing for rotation about a first axis of rotation;
      (ii) means for rotating the first shaft about the first axis of rotation;
   (b) the means for mounting the balancing assembly within the housing comprises:
      (i) a second shaft having a second eccentricity, said second shaft being mounted within the housing for rotation about a second axis of rotation;
      (ii) means for rotating the second shaft about the second axis of rotation;
   wherein the surface breaker blade, first shaft, balancing assembly and second shaft are arranged and adapted so that simultaneous rotation of the first shaft and the second shaft will impart surface breaker momentum to the surface breaker blade that is substantially equal to and opposite the balancing momentum imparted to the balancing assembly.

3. The plow assembly of claim 1 which includes a plurality of vibration isolators that are mounted between the surface breaker blade and the housing.

4. The plow assembly of claim 1 which includes a plurality of vibration isolators that are mounted between the balancing assembly and the housing.

5. The plow assembly of claim 1:
(a) which includes a mounting assembly that is adapted to be attached to a vehicle;
(b) wherein the housing is pivotally attached to the mounting assembly.

6. The plow assembly of claim 5:
(a) wherein the mounting assembly is adapted to be pivotally attached to the vehicle;
(b) which includes a first actuator that is attached between the mounting assembly and the vehicle so as to pivot the mounting assembly about a generally horizontal axis of rotation;
(c) which includes a second actuator that is attached between the housing and the mounting assembly and adapted to pivot the housing about a generally vertical axis of rotation.

7. The plow assembly of claim 2 wherein the surface breaker blade comprises:
(a) a blade mount that is mounted on the first shaft in such a manner that rotation of the first shaft causes the blade mount to move in response to the first eccentricity of the first shaft;
(b) a blade component that is detachably mounted to the blade mount.

8. The plow assembly of claim 7 wherein:
(a) the blade mount includes a first elongate component that is disposed generally horizontally within the housing;
(b) the balancing assembly includes a second elongate component that is mounted on the second shaft in such a manner that rotation of the second shaft causes the second elongate component to move in response to the second eccentricity of the second shaft, said second elongate component being disposed generally vertically within the housing.

9. The plow assembly of claim 8 wherein:
(a) the first elongate component has a first component long axis;
(b) the first elongate component has a first mass comprising a first mass front portion and a first mass rear portion, wherein said first mass front portion is located in front of a plane through the first elongate component which includes the first axis of rotation and is perpendicular to the first component long axis, and wherein said first mass rear portion is located behind the plane through the first elongate component which includes the first axis of rotation and is perpendicular to the first component long axis;
(c) the first mass front portion is equal to the first mass rear portion;
(d) the second elongate component has a second component long axis;
(e) the second elongate component has a second mass comprising a second mass upper portion and a second mass lower portion, wherein said second mass upper portion is located above a second plane which passes through the second elongate component which includes the second axis of rotation and is perpendicular to the second component long axis, and wherein said second mass lower portion is located below the second plane through the second elongate component which includes the second axis of rotation and is perpendicular to the second component long axis;
(f) the second mass upper portion is equal to the second mass lower portion.

10. A plow assembly comprising:
(a) a housing;
(b) a shaft that is mounted in the housing for rotation about an axis of rotation, said shaft having a first eccentric portion and a second eccentric portion;
(c) a motor that is mounted so as to rotate the shaft with respect to the housing;
(d) a surface breaker blade that is mounted so as to move in response to the first eccentric portion of the shaft;
(e) a balancing assembly that is mounted in the housing so as to move in response to the second eccentric portion of the shaft;
wherein the surface breaker blade, balancing assembly, shaft, first eccentric portion and second eccentric portion are arranged and adapted so that rotation of the shaft will impart surface breaker momentum to the surface breaker blade with respect to the housing and will impart balancing momentum to the balancing assembly with respect to the housing, said surface breaker momentum being substantially equal to and opposite the balancing momentum.

11. The plow assembly of claim 10 wherein:
(a) the housing includes a left side wall, a right side wall and a rear wall;
(b) a first vibration isolator is mounted between the surface breaker blade and the left side wall of the housing;
(c) a second vibration isolator is mounted between the surface breaker blade and the right side wall of the housing;
(d) a third vibration isolator is mounted between the balancing assembly and the left side wall of the housing;
(e) a fourth vibration isolator is mounted between the balancing assembly and the right side wall of the housing.

12. The plow assembly of claim 11 which includes a fifth vibration isolator that is mounted between the surface breaker blade and the rear wall of the housing.

13. The plow assembly of claim 10 wherein the surface breaker blade comprises:
(a) a blade mount that is mounted on the shaft in such a manner that rotation of the shaft causes the blade mount to move in response to the first eccentric portion of the shaft;
(b) a blade component that is detachably mounted to the blade mount.

14. The plow assembly of claim 13 wherein:
(a) the blade mount includes a first elongate component that is disposed generally horizontally within the housing;
(b) the balancing assembly includes a second elongate component that is disposed generally vertically within the housing, said second elongate component being mounted on the shaft in such a manner that rotation of the shaft causes the second elongate component to move in response to the second eccentric portion of the shaft.

15. The plow assembly of claim 14 wherein:
(a) the first elongate component has a first component long axis;
(b) the first elongate component has a first mass comprising a first mass front portion and a first mass rear portion, wherein said first mass front portion is located in front of a plane through the first elongate component which includes the first axis of rotation and is perpendicular to the first component long axis, and wherein said first mass rear portion is located behind the plane through the first elongate component which includes the first axis of rotation and is perpendicular to the first component long axis;

(c) the first mass front portion is equal to the first mass rear portion;
(d) the second elongate component has a second component long axis;
(e) the second elongate component has a second mass comprising a second mass upper portion and a second mass lower portion, wherein said second mass upper portion is located above a second plane which passes through the second elongate component which includes the second axis of rotation and is perpendicular to the second component long axis, and wherein said second mass lower portion is located below the second plane through the second elongate component which includes the second axis of rotation and is perpendicular to the second component long axis;
(f) the second mass upper portion is equal to the second mass lower portion.

16. A plow assembly which comprises:
(a) a housing;
(b) a shaft that is mounted in the housing for rotation about an axis of rotation, said shaft having a first eccentric portion and a second eccentric portion;
(c) means for rotating the shaft;
(d) a surface breaker blade comprising:
  (i) a blade mount that is mounted on the shaft in such a manner that rotation of the shaft causes the blade mount to move in response to the first eccentric portion of the shaft, said blade mount having a blade mount long axis and a blade mount mass, said blade mount mass comprising a blade mount mass front portion and a blade mount mass rear portion, wherein said blade mount mass front portion is located in front of a first plane through the blade mount which includes the axis of rotation and is perpendicular to the blade mount long axis, and wherein said blade mount mass rear portion is located behind the first plane, and wherein said blade mount mass front portion is equal to said blade mount mass rear portion;
  (ii) a blade component that is detachably mounted to the blade mount;
(e) a balancing assembly:
  (i) that is mounted on the shaft so as to move in response to the second eccentric portion of the shaft;
  (ii) which has a balancing assembly long axis;
  (iii) which has a balancing assembly mass that is approximately equal to the blade mount mass and is configured so as to be generally divided equally between a balancing assembly mass upper portion and a balancing assembly mass lower portion, wherein said balancing assembly mass upper portion is located above a second plane which passes through the balancing assembly which includes the axis of rotation and is perpendicular to the balancing assembly long axis, and wherein said balancing assembly mass lower portion is located below the second plane, and wherein said balancing assembly mass upper portion is equal to said balancing assembly mass lower portion;
wherein the housing, shaft, means for rotating the shaft, surface breaker blade and balancing assembly are configured and arranged so that vibrations created by the interaction between and among the shaft, means for rotating the shaft, surface breaker blade and balancing assembly are generally confined within the housing.

17. The plow assembly of claim 16 wherein:
(a) the housing includes a left side wall, a right side wall and a rear wall;
(b) a first vibration isolator is mounted between the surface breaker blade and the left side wall of the housing; and
(c) a second vibration isolator is mounted between the surface breaker blade and the right side wall of the housing; and
(d) a third vibration isolator is mounted between the balancing assembly and the left side wall of the housing; and
(e) a fourth vibration isolator is mounted between the balancing assembly and the right side wall of the housing.

18. The plow assembly of claim 17 which includes a fifth vibration isolator that is mounted between the surface breaker blade and the rear wall of the housing.

19. The plow assembly of claim 16:
(a) which includes a mounting assembly that is adapted to be attached to a vehicle;
(b) wherein the housing is pivotally attached to the mounting assembly.

20. The plow assembly of claim 19:
(a) wherein the mounting assembly is adapted to be pivotally attached to the vehicle;
(b) which includes a first actuator that is attached between the mounting assembly and the vehicle so as to pivot the mounting assembly about a generally horizontal axis of rotation;
(c) which includes a second actuator that is attached between the housing and the mounting assembly and adapted to pivot the housing about a generally vertical axis of rotation.

* * * * *